(12) United States Patent
Takahashi et al.

(10) Patent No.: US 11,382,162 B2
(45) Date of Patent: Jul. 5, 2022

(54) USER APPARATUS

(71) Applicant: NTT DOCOMO, INC., Tokyo (JP)

(72) Inventors: Hideaki Takahashi, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 113 days.

(21) Appl. No.: 16/766,493

(22) PCT Filed: Nov. 14, 2018

(86) PCT No.: PCT/JP2018/042117
§ 371 (c)(1),
(2) Date: May 22, 2020

(87) PCT Pub. No.: WO2019/107151
PCT Pub. Date: Jun. 6, 2019

(65) Prior Publication Data
US 2020/0383165 A1    Dec. 3, 2020

(30) Foreign Application Priority Data

Nov. 29, 2017 (JP) .............................. JP2017-229571

(51) Int. Cl.
*H04W 76/19* (2018.01)
*H04W 72/04* (2009.01)
*H04W 74/08* (2009.01)

(52) U.S. Cl.
CPC ......... *H04W 76/19* (2018.02); *H04W 72/046* (2013.01); *H04W 72/0413* (2013.01); *H04W 74/0833* (2013.01)

(58) Field of Classification Search
CPC ........... H04W 56/0045; H04W 74/004; H04W 76/19; H04W 72/0413; H04W 72/046; H04W 74/0833; H04B 7/0695
See application file for complete search history.

(56) References Cited

U.S. PATENT DOCUMENTS

2018/0020487 A1*  1/2018  Tsai ..................... H04W 74/004
2020/0382189 A1* 12/2020  Chen ..................... H04W 16/28
(Continued)

FOREIGN PATENT DOCUMENTS

| EP | 3586469 A1 | 1/2020 |
|---|---|---|
| WO | 2019/139962 A1 | 7/2019 |

OTHER PUBLICATIONS

Extended European Search Report issued in counterpart European Patent Application No. 18884376.7, dated Jul. 16, 2021 (11 pages).
(Continued)

*Primary Examiner* — Brian D Nguyen
(74) *Attorney, Agent, or Firm* — Osha Bergman Watanabe & Burton LLP

(57) ABSTRACT

A user apparatus that performs beamforming-applied communications with a base station apparatus is provided. The user apparatus includes a reception unit configured to receive a beam transmitted from the base station apparatus, a control unit configured to perform control related to recovery of connection to the base station apparatus in a case where the reception unit fails to receive the beam, and a transmission unit configured to transmit a random access preamble or an uplink control signal based on the control related to recovery of connection.

7 Claims, 7 Drawing Sheets

(56) References Cited

U.S. PATENT DOCUMENTS

| | | | | |
|---|---|---|---|---|
| 2020/0389220 | A1* | 12/2020 | Kang | H04W 74/0833 |
| 2020/0389282 | A1* | 12/2020 | Turtinen | H04L 5/0092 |
| 2020/0404638 | A1* | 12/2020 | Deogun | H04L 5/0091 |
| 2021/0021323 | A1* | 1/2021 | Kwon | H04B 7/0695 |
| 2021/0083821 | A1* | 3/2021 | Park | H04W 76/30 |
| 2021/0175945 | A1* | 6/2021 | Chen | H04W 48/20 |
| 2021/0203394 | A1* | 7/2021 | Zhang | H04B 7/0626 |

OTHER PUBLICATIONS

ZTE Corporation, Sanechips: "Discussion on the beam failure recovery impact on RAN2"; 3GPP TSG-RAN WG2 Meeting #100, R2-1713954 (revision of R2-1713406); Reno, USA, Nov. 27-Dec. 1, 2017 (13 pages).

Huawei, HiSilicon; "Maintenance of Uplink Time Alignment in NR"; 3GPP TSG-RAN WG2 #99bis meeting, R2-1711438; Prague, Czech Republic, Oct. 9-13, 2017 (3 pages).

Office Action issued in the counterpart Korean Patent Application No. 10-2020-7015920, dated May 25, 2021 (10 pages).

Lenovo, Motorola Mobility; "Prioritized random access for beam failure recovery"; 3GPP TSG-RAN WG2 Meeting#100, R2-1713688; Reno, USA, Nov. 27-Dec. 1, 2017 (2 pages).

MediaTek Inc.; "Beam Management and Beam Recovery in MAC"; 3GPP TSG-RAN WG2 #100, R2-1712871; Reno, USA, Nov. 27-Dec. 1, 2017 (4 pages).

International Search Report issued in PCT/JP2018/042117 dated Jan. 8, 2019 (7 pages).

Written Opinion of the International Searching Authority issued in PCT/JP2018/042117 dated Jan. 8, 2019 (5 pages).

Huawei, HiSilicon; "Procedure details for beam failure recovery"; 3GPP TSG RAN WG1 NR Ad Hoc Meeting, R1-1709930; Qingdao, China; Jun. 27-30, 2017 (6 pages).

Huawei, HiSilicon; "RAN2 aspects of DL beam management"; 3GPP TSG-RAN WG2#99bis, R2-1710562; Prague, Czech Republic; Oct. 9-13, 2017 (5 pages).

NTT Docomo, Inc.; "Discussion on Beam failure recovery"; 3GPP TSG-RAN WG2 NR Ad hoc 1801, R2-1801404; Vancouver, Canada; Jan. 22-26, 2018 (3 pages).

3GPP TS 36.211 V14.4.0; "3rd Generation Partnership Project; Technical Specification Group Radio Access Network; Evolved Universal Terrestrial Radio Access (E-UTRA); Physical channels and modulation (Release 14)"; Sep. 2017 (197 pages).

3GPP TS 37.340 V1.2.0; "3rd Generation Partnership Project; Technical Specification Group Radio Access Network; Evolved Universal Terrestrial Radio Access (E-UTRA) and NR; Multi-connectivity; Stage 2 (Release 15)"; Oct. 2017 (50 pages).

* cited by examiner

DIGITAL BEAMFORMING

ANALOG BEAMFORMING

HYBRID BEAMFORMING

USER APPARATUS

BACKGROUND OF THE INVENTION

1. Field of the Invention

The present invention relates to a user apparatus in a wireless communication system.

2. Description of the Related Art

In 3GPP (3rd Generation Partnership Project), in order to realize further larger system capacity, further faster data transmission speed, further lower latency in a wireless communication section, etc., a wireless communication method called 5G or NR (New Radio) has been discussed (hereinafter, the wireless communication method is referred to as "5G" or "NR"). In 5G, various wireless technologies have been discussed in order to meet requirements including latency equal to or less than 1 ms in a wireless section while realizing a throughput equal to or greater than 10 Gbps.

In NR, wireless communications using millimeter waves have been discussed, in which it is assumed that a wide range of frequencies including a frequency band much higher than LTE (Long Term Evolution) will be used. Propagation loss increases especially in a high frequency band. Therefore, in order to cover the propagation loss, an application of beamforming with a narrow beam width has been discussed (e.g., Non-Patent Document 1).

In an NR system, introduction of a technology called "LTE-NR Dual Connectivity" or "Multi-RAT (Multi Radio Access Technology) Dual Connectivity" has been discussed, in which, similar to the Dual Connectivity in an LTE system, data sets are divided between a base station apparatus of the LTE system (eNB) and a base station apparatus of the NR system (gNB) and the divided data sets are transmitted to or received by the base station apparatuses at the same time (e.g., Non-Patent Document 2).

CITATION LIST

Non-Patent Document

[Non-Patent Document 1] 3GPP TS 36.211 V14.4.0 (2017-09) [Non-Patent Document 2] 3GPP TS 37.340 V1.2.0 (2017-10)

SUMMARY OF THE INVENTION

Technical Problem

In a current discussion of the NR system, it has been discussed that a user apparatus performs a random access procedure in a case where the user apparatus detects a state (i.e., a state of "Beam Failure") in which no beam is received even if there is switching of beams for a beamforming-applied reception target downlink signal. However, it has not been clearly specified whether the user apparatus is allowed to transmit an uplink signal during a period in which the random access procedure is being performed in order to recover the connection after detecting the "Beam Failure".

In view of the above, it is an object of the present invention to cause a user apparatus performing beamforming-applied communications to appropriately control transmission of an uplink signal in a process of recovering from a beam detection failure.

Solution to Problem

According to an embodiment of the present invention, a user apparatus that performs beamforming-applied communications with a base station apparatus is provided. The user apparatus includes a reception unit configured to receive a beam transmitted from the base station apparatus, a control unit configured to perform control related to recovering a connection with the base station apparatus in a case where the reception unit fails to receive the beam, and a transmission unit configured to transmit a random access preamble or an uplink control signal based on the control related to recovering the connection.

Advantageous Effects of Invention

According to an embodiment of the present invention, it is possible for a user apparatus performing beamforming-applied communications to appropriately control transmission of an uplink signal in a process of recovering from a beam detection failure.

DETAILED DESCRIPTION OF THE PREFERRED EMBODIMENTS

Figure 1:
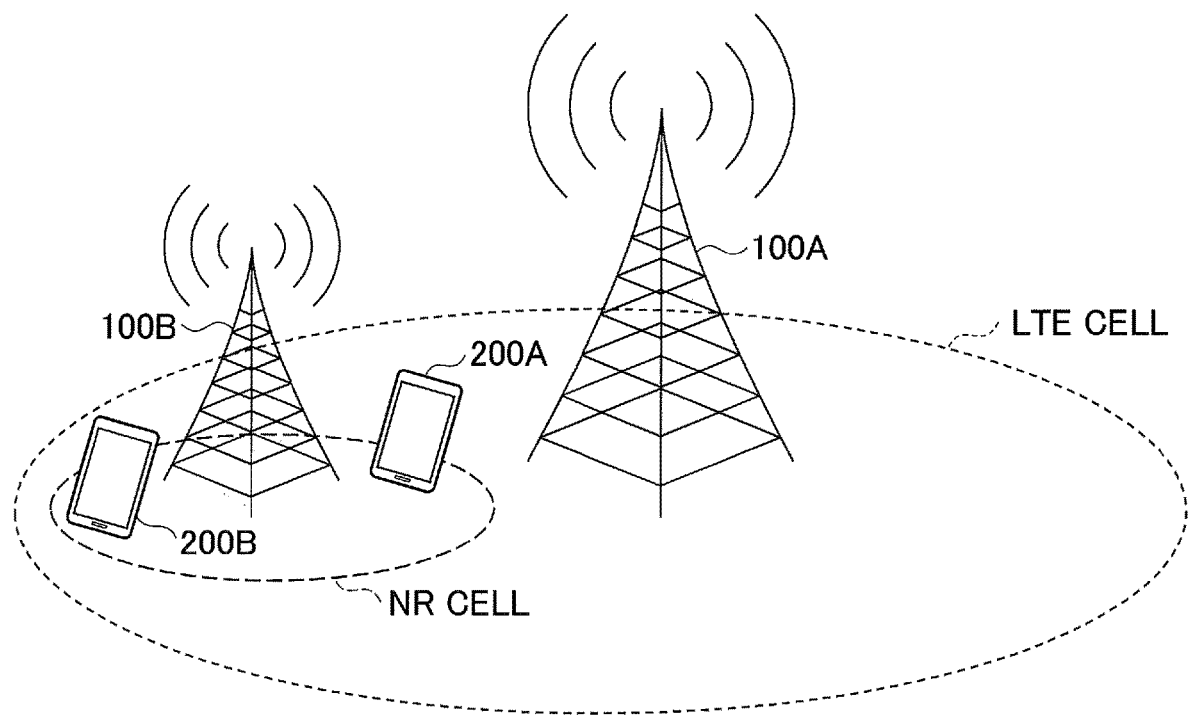
FIG. 1 is a drawing illustrating a configuration example of a wireless communication system according to an embodiment of the present invention.

In the following, referring to the drawings, one or more embodiments of the present invention will be described. It should be noted that the embodiments described below are just examples. Embodiments of the present invention are not limited to the following embodiments.

In operations of a wireless communication system according to an embodiment of the present invention, conventional techniques may be used if necessary. It should be noted that, although the conventional techniques are related to the existing LTE, the conventional techniques are not limited to the existing LTE. Further, it is assumed that the term "LTE" used in the present specification has, unless otherwise specifically mentioned, a broad meaning including a scheme of LTE-Advanced and a scheme after the LTE-Advanced (e.g., 5G or NR).

Further, in the following embodiments, the terms such as SS (Synchronization Signal), PSS (Primary SS), SSS (Secondary SS), PBCH (Physical broadcast channel), etc., are used for the sake of convenience. The signals, functions, etc., similar to the above, may be referred to different terms. Further, the above-described terms used in NR will be referred to as "NR-SS", "NR-PSS", "NR-SSS", "NR-PBCH", etc.

FIG. 1 is a drawing illustrating a configuration example of a wireless communication system according to an embodiment of the present invention. As illustrated in FIG. 1, the wireless communication system includes a base station apparatus 100 and a user apparatus 200. In FIG. 1, two base station apparatuses 100 and two user apparatuses 200 are illustrated as examples. There may be further more of the base station apparatuses 100 and the user apparatuses 200.

The base station apparatus 100 is a communication apparatus that provides one or more cells and performs wireless communications with the user apparatus 200. For example, as illustrated in FIG. 1, a base station apparatus 100A is an LTE cell, and a base station apparatus 100B is an NR cell (hereinafter, referred to as "base station apparatuses 100" when they are not distinguished).

The base station apparatus 100B is a communication apparatus that provides one or more NR cells and performs wireless communications with the user apparatus 200 according to NR. When the base station apparatus 100B communicates with the user apparatus 200 according to NR, the base station apparatus 100A and the base station apparatus 100B may communicate with the user apparatus 200 in parallel using Dual Connectivity. The base station apparatus 100 and the user apparatus 200 may transmit and receive signals by performing the beamforming.

The user apparatus 200A and the user apparatus 200B (hereinafter referred to as "user apparatuses 200" when they are not distinguished) are communication apparatuses, which have wireless communication functions, such as smart-phones, mobile phones, tablets, wearable terminals, M2M (Machine-to-Machine) communication modules, etc. The user apparatuses 200 are wirelessly connected to the base station apparatus 100A or the base station apparatus 100B, and use various communication services provided by the wireless communication system. At the time of initial access or at the time of resuming wireless connection, the user apparatus 200 starts random access procedure by transmitting a random access preamble signal to the base station apparatus 100. The random access is performed based on, in addition to broadcast information received from the base station apparatus 100 via PBCH, broadcast information received via PDSCH (Physical downlink shared channel). It is possible for the user apparatus 200 to start connecting to the base station apparatus 100B based on information obtained from the base station apparatus 100A. Further, the user apparatus 200 may start connecting to the base station apparatus 100B based on information obtained from the base station apparatus 100B without connecting to the base station apparatus 100A.

Here, because a physical location of the user apparatus 200A is different from a physical location of the user apparatus 200B, an uplink signal from the user apparatus 200A and an uplink signal from the user apparatus 200B arrive at the base station apparatus A or the base station apparatus 100B at different time (different timings) even if the uplink signals have been transmitted at the same time. Here, in order to prevent interference between symbols of uplink signals transmitted from the user apparatuses 200, the base station apparatus 100 controls uplink signal transmission timings of the user apparatuses 200 by using timing advance commands so that a delay signal is included in a cyclic prefix (CP) part of a symbol included in an uplink signal. In other words, the uplink signals transmitted from the user apparatuses 200 are controlled to arrive at the base station apparatus 100 at the same time by using the timing advance command.

The timing advance command may be transmitted to the user apparatus 200 by having the timing advance command included in a random access response transmitted from the base station apparatus 100 to the user apparatus 200. Further, the timing advance command may be transmitted to the user apparatus 200 at other event timings, or the like. It is possible for the user apparatus 200 to adjust the timing of uplink signal transmission by using the received timing advance command. Further, the user apparatus 200 may start or restart a TA timer (timeAlignmentTimer) upon receiving the timing advance command. When the TA timer expires, the user apparatus 200 stops the uplink signal transmission.

It should be noted that, in an embodiment of the present invention, the duplex method may be TDD (Time Division Duplex) or FDD (Frequency Division Duplex). Further, in the following descriptions, "transmitting a signal using a transmission beam" may be the same as "transmitting a precoding-vector-multiplied signal (a signal precoded by a precoding vector)". Similarly, "receiving a signal using a reception beam" may be the same as "multiplying the received signal by a predetermined weight vector." Further, "transmitting a signal using a transmission beam" may be expressed as "transmitting a signal via a specific antenna port". Similarly, "receiving a signal using a reception beam" may be expressed as "receiving a signal via a specific antenna port." The antenna port refers to a logical antenna port defined in 3GPP standards. It should be noted that methods in which the transmission beam and the reception beam are formed are not limited to the methods described above. For example, a method may be used in which the base station apparatus 100 having plural antennas changes each of the antenna angles and the user apparatus 200 having plural antennas changes each of the antenna angles. A method in which the method of using precoding vectors and the method of changing antenna angles are combined may be used. Other methods may be used. Further, for example, multiple transmission beams different from each other may be used in a high frequency band. An operation using multiple transmission beams is referred to as a "multi-beam operation", and an operation using a single transmission beam is referred to as a "single-beam operation".

<Beamforming Example>

Figure 2:
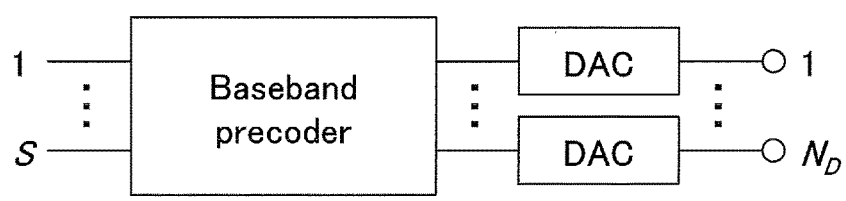
FIG. 2 is a drawing illustrating a configuration example of a circuit that performs digital beamforming.

FIG. 2 is a drawing illustrating a configuration example of a circuit that performs digital beamforming. As illustrated in FIG. 2, a digital beamforming method has been discussed as a method for implementing the beamforming, in which: a number of DACs (Digital Analog Converters) are provided, the number being the same as the number of transmission antenna elements; and the baseband signal processing with precoding is performed as many times as the number of transmission antenna elements.

Figure 3:
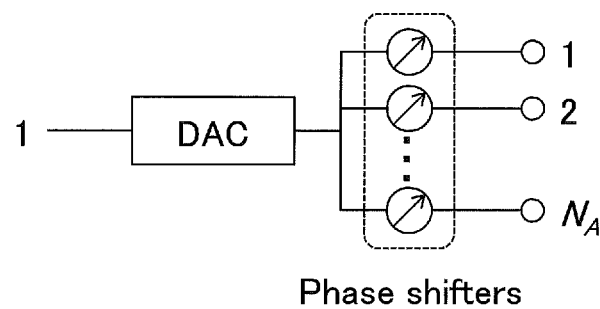
FIG. 3 is a drawing illustrating a configuration example of a circuit that performs analog beamforming.

FIG. 3 is a drawing illustrating a configuration example of a circuit that performs analog beamforming. As illustrated in FIG. 3, an analog beamforming method has been discussed as a method for implementing the beamforming, in which, at a stage after a transmission signal is converted to an analog signal via a DAC, the beamforming is performed using variable phase shifters in a RF (Radio Frequency) circuit.

Figure 4:
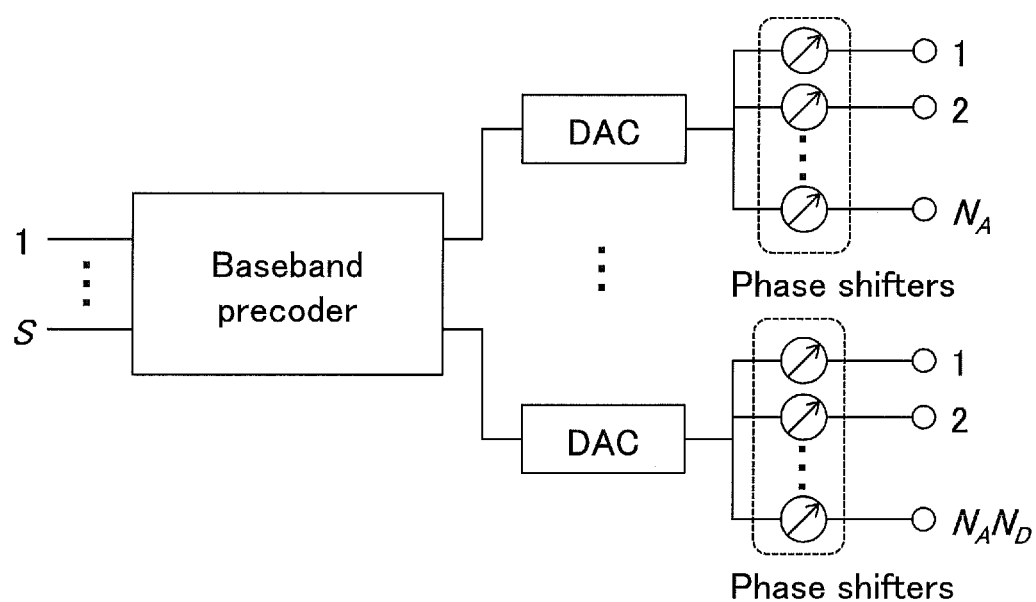
FIG. 4 is a drawing illustrating a configuration example of a circuit that performs hybrid beamforming.

FIG. 4 is a drawing illustrating a configuration example of a circuit that performs hybrid beamforming. The hybrid beamforming has been discussed in which the beamforming processing is implemented by combining the digital beamforming and the analog beamforming so that the beamforming processing is realized by using: the baseband signal processing in which precoding is performed; and the variable phase shifters included in the RF (Radio Frequency) circuit as illustrated in FIG. 4.

EMBODIMENT

In the following, one or more embodiments will be described.

Figure 5:
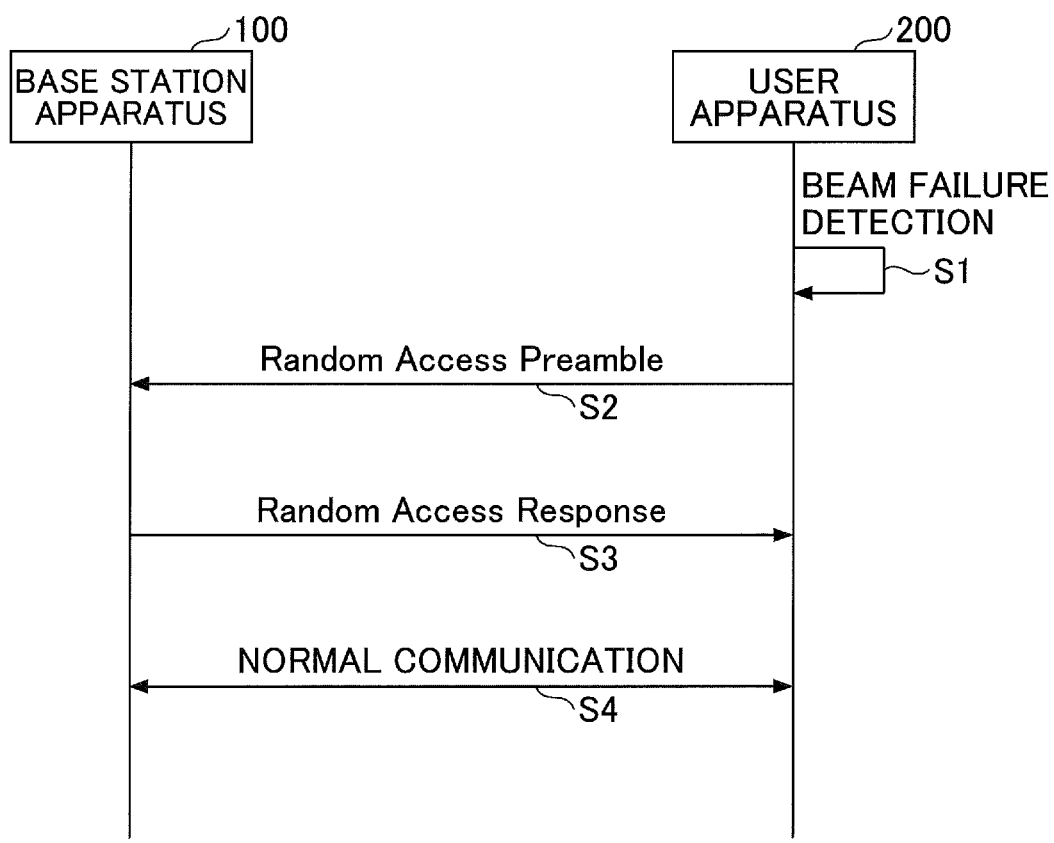
FIG. 5 is an example of a sequence of transmission control in an embodiment of the present invention.

FIG. 5 is an example of a sequence of transmission control in an embodiment of the present invention. In FIG. 5, antenna characteristics of the user apparatus 200 on a horizontal plane are schematically illustrated.

As illustrated in FIG. 5, in step S1, the user apparatus 200 detects a beam failure. In other words, the user apparatus 200 is in a situation in which the user apparatus 200 is unable to receive a downlink signal beam transmitted from the base station apparatus 100. Next, in step S2, the user apparatus 200 starts a random access procedure by transmitting a random access preamble to the base station apparatus 100. The random access procedure may be a contention-free random access procedure. Next, in step S3, the base station apparatus 100 transmits a random access response to the user apparatus 200. The random access response may include a timing advance command. The user apparatus 100 adjusts the timing of uplink signal transmission based on the received timing advance command, and transitions to the normal communications.

Here, in the case where the user apparatus 200 performs recovering from the beam failure, the contention-free random access procedure may be used. It has been discussed that a recovery from beam failure should be defined as one of the triggers for the user apparatus 200 to perform a random access procedure in the MAC (Media Access Control) layer specification. It should be noted that a PRACH (Physical Random Access Channel) resource used for the contention-free random access may be selected from a conventional RACH resource pool, or may be semi-statically defined in advance. Further, a sequence related to the PRACH resource may be set (configured) in the user apparatus 200. Further, instead of the contention-free random access procedure, the contention-based random access may be used.

In LTE, the random access procedure is performed in the case where uplink signal synchronization (i.e., timing alignment) is not obtained. Therefore, the user apparatus 200 does not transmit an uplink signal when the random access procedure is being performed. In NR, on the other hand, in the case where the MAC layer starts the random access procedure according to a beam failure indication transmitted from the PHY layer (physical layer or layer 1) or according to a request for recovering from the beam failure, it is unclear whether or not the timing alignment related to the uplink signal is obtained (i.e., whether or not the uplink signal transmission is enabled) because the beam failure has occurred in the downlink. Therefore, it is necessary to appropriately control the uplink signal transmission in a period when the random access procedure is being performed by the MAC layer according to the beam failure indication or according to a request for recovering from the beam failure.

Figure 6:
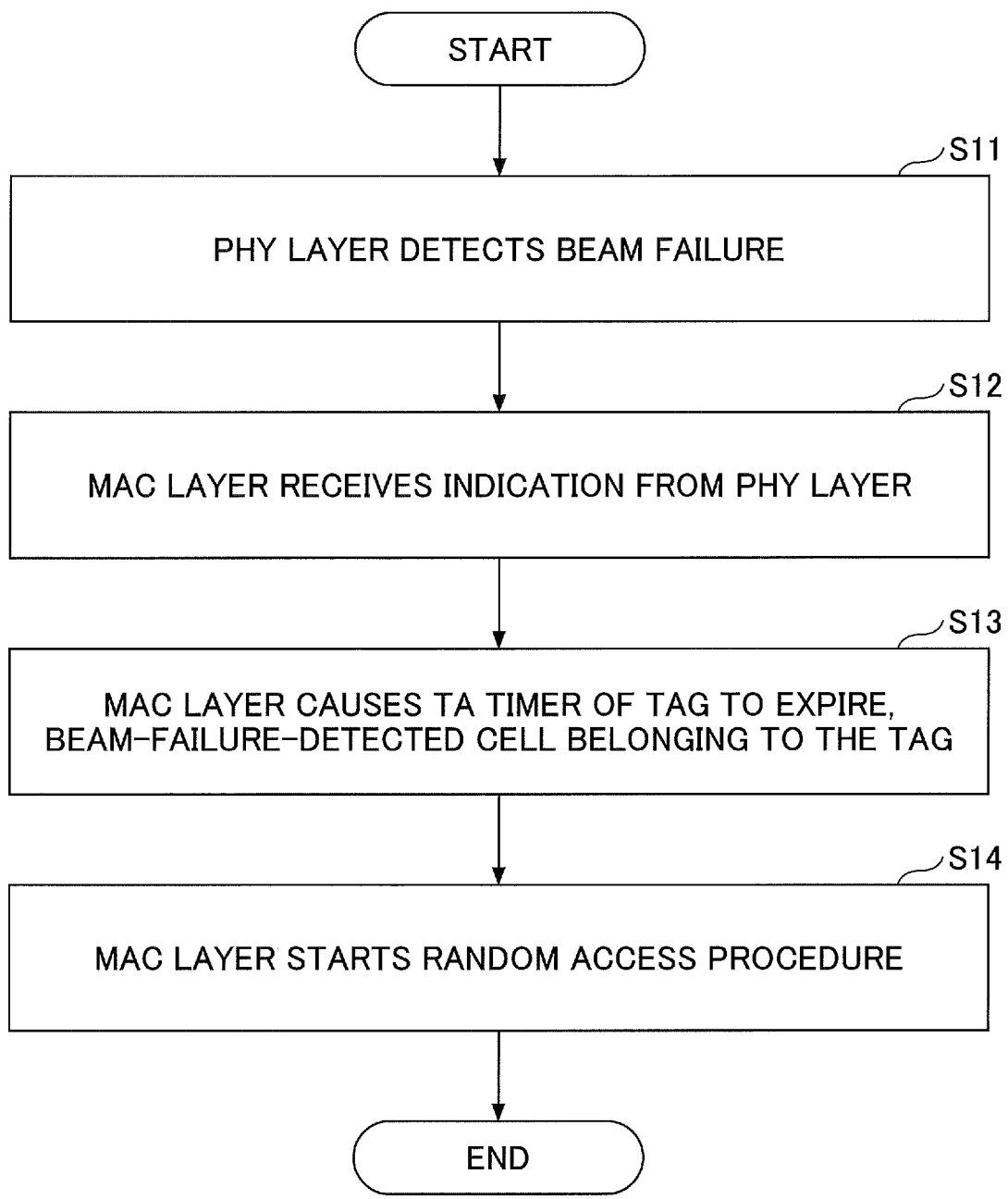
FIG. 6 is a flowchart illustrating an example of a process in a MAC layer in an embodiment of the present invention.

FIG. 6 is a flowchart illustrating an example of a process in a MAC layer in an embodiment of the present invention. Using the flowchart illustrated in FIG. 6, a control example of the MAC layer will be described when the PHY layer detects the beam failure in the user apparatus 200. In other words, operations of the user apparatus 200 from step S1 to step S2 in a sequence illustrated in FIG. 5 will be described in detail.

In step S11, the PHY layer detects a beam failure in the user apparatus 200. Here, referring to FIG. 7, a TAG (Timing Alignment Group) will be described.

Figure 7:
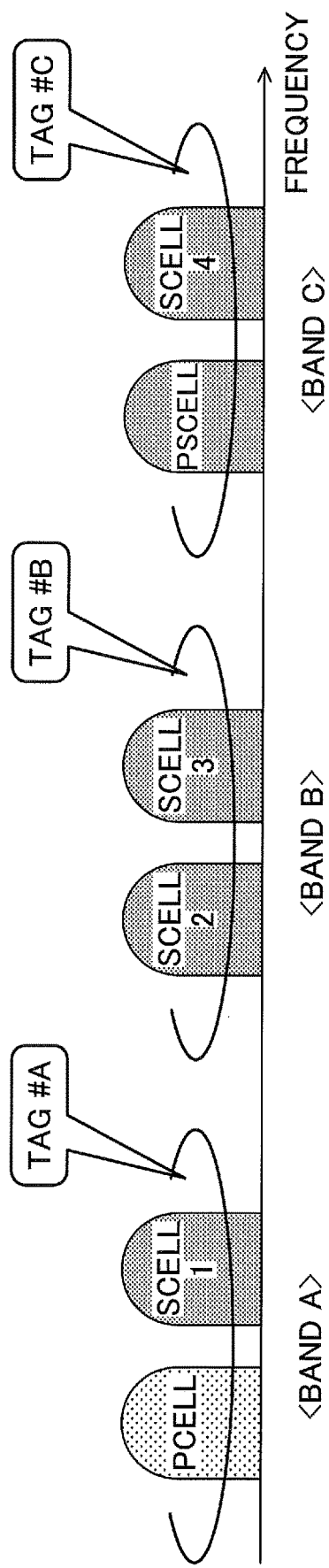
FIG. 7 is a drawing illustrating a TAG in an embodiment of the present invention.

FIG. 7 is a drawing illustrating a TAG in an embodiment of the present invention. FIG. 7 illustrates a situation in which three TAGs (TAG #A, TAG #B, TAG #C) are configured. "PCell" and "SCell 1" belong to TAG #A and use a band A. "SCell 2" and "SCell 3" belong to TAG #B and use a band B. "PSCell" and "SCell 4" belong to TAG #C and use a band C. The "PCell" and the "SCell" are a PCell (Primary Cell) and SCell (Secondary Cell) in CA (Carrier Aggregation) or DC (Dual Connectivity), respectively. The "PSCell" is a PSCell (Primary SCell) in DC. It should be noted that, for example, it may be a case that the band A is used for LTE and the band B and band C are used for NR, or it may be a case that the band A, the band B, and the band C are used for NR.

A TA timer is set for each of the TAGs. In FIG. 7, the TAGs are configured per band. However, it is not essential that the TAGs are configured per band. An example is illustrated in FIG. 7 in which a TAG corresponds to multiple cells whose radio characteristics are similar to each other for a particular user apparatus 200. Further, a TAG that includes a PCell may be defined as a pTAG (primary TAG), and a TAG that does not include a PCell may be defined as a sTAG (secondary TAG). In other words, the TAG #A is a pTAG, and the TAG #B or the TAG #C is a sTAG in FIG. 7.

Return to FIG. 6. In step S12, the MAC layer receives a beam failure indication from the PHY layer. Upon receiving the indication, the MAC layer may perform any one of three control examples as described below.

The first control example will be described. When the PHY layer detects a beam failure on a serving cell that belongs to a certain TAG, the PHY layer transmits a "beam failure recovery request" to the MAC layer (S12). A MAC entity assumes that a TA timer of the TAG expires (S13) at the time when the "beam failure recovery request" is received by the MAC layer. In other words, after the expiration of the TA timer, the user apparatus 200 does not transmit an uplink signal other than the random access preamble transmission. Next, the MAC layer starts the random access procedure (S14).

The second control example will be described below. When the PHY layer detects a beam failure on a serving cell that belongs to a certain TAG, the PHY layer transmits a "beam failure recovery request" to the MAC layer (S12). A MAC entity assumes that a TA timer of the TAG expires (S13) at the time when the "beam failure recovery request" is received by the MAC layer and the random access procedure is started on the serving cell (S14). In other words, after the expiration of the TA timer, the user apparatus 200 does not transmit an uplink signal other than the random access preamble transmission. In the second control example, step 14 may be performed before step 13.

The third control example will be described below. When the PHY layer detects a beam failure on a serving cell that belongs to a certain TAG, the PHY layer transmits an indication of "beam failure detection" to the MAC layer (S12). A MAC entity assumes that a TA timer of the TAG expires (S13) at the time when the indication is received by the MAC layer and the random access procedure is started on the serving cell. In other words, after the expiration of the TA timer, the user apparatus 200 does not transmit an uplink signal other than the random access preamble transmission. Next, the MAC layer starts the random access procedure (S14).

In the first control example through the third control example, in the case where a TA timer of a certain TAG is caused to expire, a TA timer of a TAG other than the certain TAG may be maintained in an activated state. For example, in the case where a TA timer of the pTAG expires, a state of a TA timer of the sTAG may be maintained and only the TA timer of the pTAG may be caused to expire.

Further, in a flowchart in which the PHY layer detects detects the "beam failure" and transmits the "beam failure recovery request", and the MAC layer starts the random access procedure, "modelings" (operations) of the PHY layer and the MAC layer may be as follows:
1) the PHY layer transmits the "beam failure recovery request" to the MAC layer, and the MAC layer starts the random access procedure;
2) the PHY layer transmits an indication of "beam failure detection" to the MAC layer, and the "beam failure recovery request" is triggered by the MAC layer, and the MAC layer starts the random access procedure; and
3) the PHY layer detects the "beam failure" and performs the "beam failure recovery request". Further, the PHY layer transmits an indication of the start of the random access procedure to the MAC layer, and the MAC layer starts the random access procedure. When the PHY layer transmits an indication of the start of the random access procedure to the MAC layer, the "beam failure" or "recovery from beam failure" may be set as a Cause.

It should be noted that, as the fourth control example, even in the case where the random access procedure has been started due to the beam failure recovery request, the TA timer may not necessarily be caused to expire and a state may be maintained in which the timing alignment has been obtained. It should be noted, however, that, during a period until the random access procedure initiated by the beam failure recovery request is completed, the MAC entity does not transmit other physical channels or physical signals, such as PUSCH (Physical Uplink Shared Channel), PUCCH (Physical Uplink Control Channel), SRS (Sounding Reference Signal), or the like, even if there are transmission opportunities. In other words, the random access procedure for the beam failure recovery may be given higher priority than other uplink signal transmissions. The user apparatus 200 may discard a UL grant for PUSCH transmission received via PDCCH if the UL grant has been received during a period before the random access procedure is completed. Alternatively, the user apparatus 200 may perform preparation of PUSCH transmission based on the UL grant received via PDCCH. In other words, a UL MAC PDU may be generated. In the case where the random access procedure is not completed yet at the timing of the UL MAC PDU transmission, it is not necessary to perform PUSCH transmission according to the generated UL MAC PDU.

The above-described operations, which are related to uplink transmissions during the random access procedure, may be applied to all of the serving cells that belong to the same TAG as the serving cell in which the random access procedure has been started according to the beam failure recovery request. Further, uplink transmission may be performed during a period in which the random access procedure is being performed in a serving cell that belongs to a TAG different from the serving cell in which the random access procedure has been started according to the beam failure recovery request.

The above-described first through fourth control examples may be performed only in the following cases, respectively.
1) Cases according to cell types
1-1) In a case where the beam failure is detected or the beam failure recovery request is triggered, in a serving cell in which PRACH is configured.
1-2) In a case where the beam failure is detected or the beam failure recovery request is triggered, in a serving cell in which PUCCH is configured (i.e., SpCell (special cell, that is, PCell or PSCell) or in a SCell in which PUCCH is configured.
1-3) In a case where the beam failure is detected or the beam failure recovery request is triggered, in a SpCell.
1-4) In a case where the beam failure is detected or the beam failure recovery request is triggered, in a serving cell that is specified by a network.
1-5) In a case where the beam failure is detected or the beam failure recovery request is triggered, in an activated cell.

In the case where the beam failure is detected or the beam failure recovery request is triggered in a cell other than the cells indicated in the above-described 1-1) through 1-4), the user apparatus 200 may transmit, for example, a specific CSI (Channel State Information) report with respect to the cell to the base station apparatus 100. The specific CSI report may have "Out-Of-Range (OOR)" as a CQI (Channel Quality Indicator) value. Alternatively, the user apparatus 200 may perform the beam failure recovery using PUCCH.

Further, as a method for recovering from the beam failure, a method according to PUCCH and a method according to RACH may be performed. Here, the case, in which a method using PUCCH is not applied, includes, for example, a case in which the user apparatus 200 does not have capability (Inter-operability Testing is not completed), a case in which it is signaled by a network that a method using PUCCH is not used, and a case in which information necessary for the method using PUCCH is not signaled by a network.

As described above, the methods for recovering from the beam failure based on the cell types may be summarized as follows.
1) In the PCell or the PSCell, a RACH-based beam failure recovery is performed.
2) In a normal SCell in which PRACH or uplink is not configured, the RACH-based beam failure recovery cannot be performed, and thus, PUCCH-based beam failure recovery may be performed, or the recovery may be performed by setting "OOR" as the CQI value of the CSI report.
3) In a normal SCell in which PRACH is configured, the RACH-based beam failure recovery may be performed, PUCCH-based beam failure recovery may be performed, or the recovery may be performed by setting "OOR" as the CQI value of the CSI report.

Regarding the random access procedure for recovering from the beam failure, a modified example may be applied as described below.

In the case where a random access procedure has already been started according to a different trigger or a different cause when the beam failure or the beam failure recovery is detected, the random access procedure for the beam failure recovery may be canceled without being started. The MAC layer may indicate to other layers (PHY layer, RRC layer) that the random access procedure for the beam failure recovery has been canceled.

It should be noted that it is not necessary for the random access procedure for the beam failure recovery to be canceled. The random access procedure for the beam failure recovery may be held until the already-started random access procedure is completed, and the random access procedure for the beam failure recovery may be started when the already-started random access procedure is completed. In the case where the already-started random access procedure is not completed after a predetermined elapsed period, the random access procedure for the beam failure recovery may be canceled.

It should be noted that, even in the case where a random access procedure has already been started according to another trigger or another cause when the beam failure or the beam failure recovery is detected, the random access procedure for the beam failure recovery may be started by stopping the already-started random access procedure.

It should be noted that, in the case where the beam failures or the beam failure recoveries are detected in multiple serving cells, the random access procedure may be performed according to predetermined priorities. For example, a higher priority may be provided to the SpCell (PCell or PSCell). Further, a higher priority may be provided to a cell in which PUCCH is configured (SpCell or PUCCH SCell), for example. Further, a higher priority may be provided to a cell specified by a network, for example. Further, a higher priority may be provided to a cell that has a specific identifier (CellIndex or ScellIndex).

According to the above-described embodiments, it becomes possible for the user apparatus 200 to perform appropriate uplink signal transmission control by controlling: a random access procedure for recovery from the beam detection failure; or a recovery procedure via PUCCH, according to start timings, TAGs to which the cell belongs, cell types, distinguishing conditions between the RACH based recovery and the PUCCH based recovery, already-started random access procedures, etc.

In other words, it is possible for a user apparatus performing beamforming-applied communications to appropriately control transmission of an uplink signal in a process of recovering from a beam detection failure.

(Apparatus Structure)

Next, examples of functional structures of the base station apparatus 100 and the user apparatus 200 that perform the processes and operations described above will be described. The base station apparatus 100 and the user apparatus 200 each have functions for performing an embodiment of the present invention. It should be noted that the base station apparatus 100 and the user apparatus 200 each may have only a part of the functions for performing an embodiment of the present invention.

<Base Station Apparatus 100>

Figure 8:
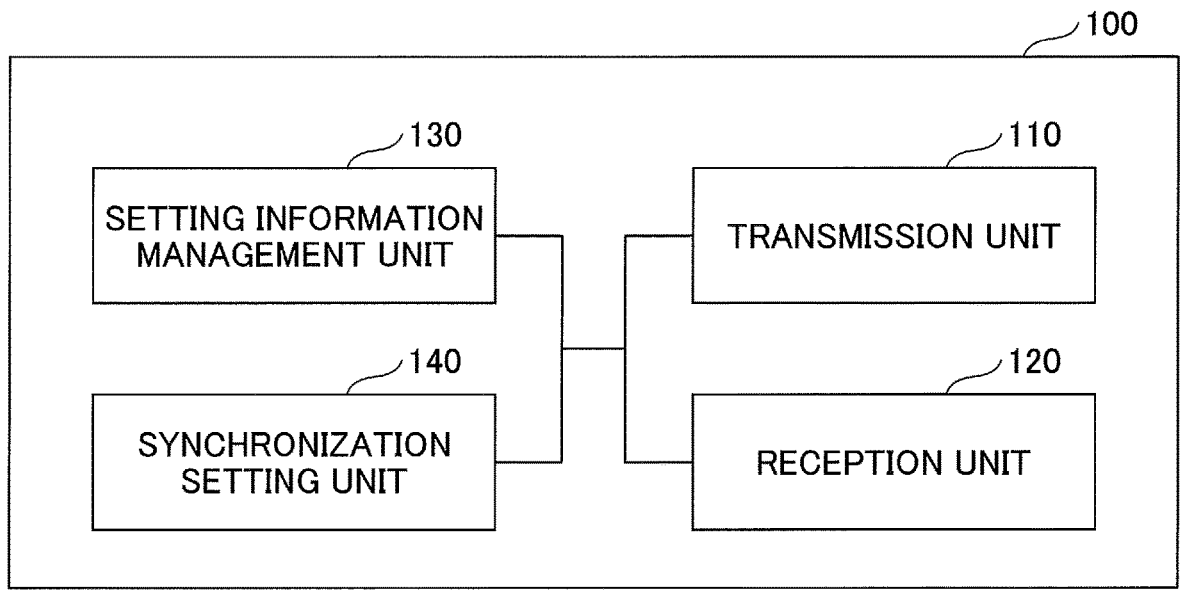
FIG. 8 is a drawing illustrating an example of a functional structure of a base station apparatus 100 according to an embodiment of the present invention.

FIG. 8 is a drawing illustrating an example of a functional structure of a base station apparatus 100. As illustrated in FIG. 8, the base station apparatus 100 includes a transmission unit 110, a reception unit 120, a setting information management unit 130, and a synchronization setting unit 140. The functional structure illustrated in FIG. 8 is merely an example. Functional divisions and names of functional units may be anything as long as operations according to an embodiment of the present invention can be performed.

The transmission unit 110 has a function for generating a signal to be transmitted to the user apparatus 200 and for transmitting the signal wirelessly. The reception unit 120 has a function for receiving various signals transmitted from the user apparatus 200 and for obtaining, for example, upper layer information from the received signals. Further, the transmission unit 110 has a function for transmitting to the user apparatus 200 NR-PSS, NR-SSS, NR-PBCH, DL/UL control signals, etc. Further, for example, the transmission unit 110 transmits a random access response to the user apparatus 200, and the reception unit 120 receives a random access preamble from the user apparatus 200.

The setting information management unit 130 stores preset setting information and various setting information items to be transmitted to the user apparatus 200. Contents of the setting information are, for example, information related to random access, information related to TAGs, etc.

The synchronization unit 140 performs configuration (setting), by the base station apparatus 100, of the user apparatus 200 related to the uplink transmission.

<User Apparatus 200>

Figure 9:
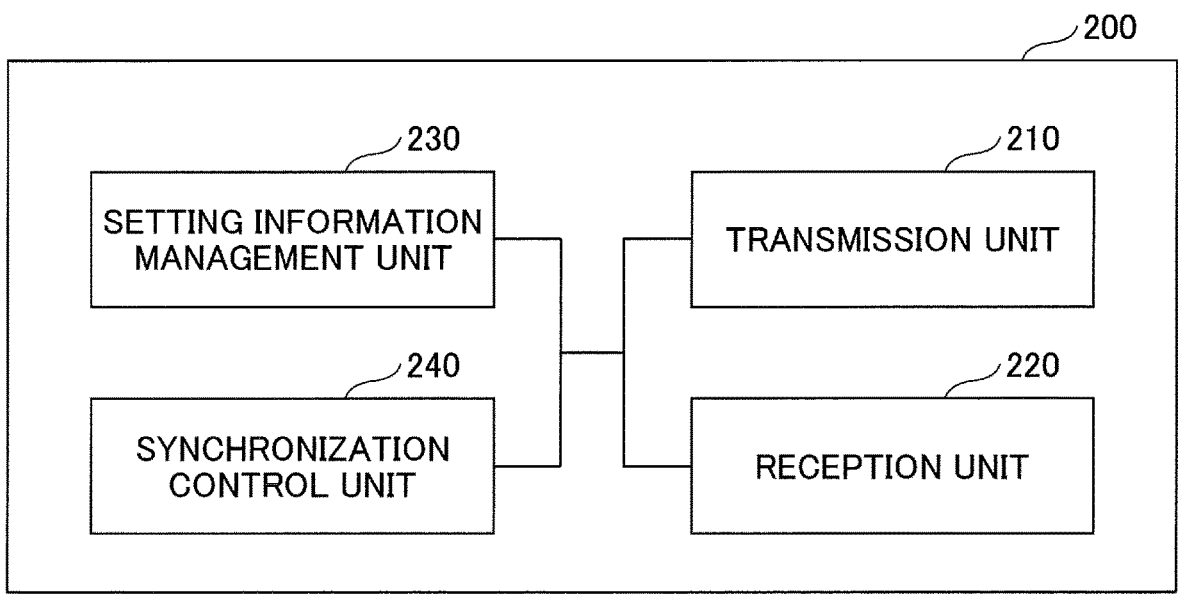
FIG. 9 is a drawing illustrating an example of a functional structure of a user apparatus 200 according to an embodiment of the present invention.

FIG. 9 is a drawing illustrating an example of a functional structure of a user apparatus 200. As illustrated in FIG. 9, the user apparatus 200 includes a transmission unit 210, a reception unit 220, a setting information management unit 230, and a synchronization control unit 240. The functional structure illustrated in FIG. 9 is merely an example. Functional divisions and names of functional units may be anything as long as operations according to an embodiment of the present invention can be performed.

The transmission unit 210 generates a transmission signal from transmission data and transmits the transmission signal wirelessly. The reception unit 220 receives various signals wirelessly and obtains upper layer signals from the received physical layer signals. Further, the reception unit 220 has a function for receiving NR-PSS, NR-SSS, NR-PBCH, DL/UL control signals, etc., transmitted from the base station apparatus 100. Further, for example, the transmission unit 210 transmits a random access preamble to the base station apparatus 100, and the reception unit 220 receives a random access response from the base station apparatus 100.

The setting information management unit 230 stores various setting information items received by the reception unit 220 from the base station apparatus 100. Further, the setting information management unit 230 also stores preset setting information. Contents of the setting information are, for example, information related to random access, information related to TAG settings, etc.

The synchronization control unit 240 controls uplink transmission by the user apparatus 200 described in an embodiment of the present invention. It should be noted that the functional units related to signal transmission, in the synchronization control unit 240, may be included in the transmission unit 210, and the functional units related to signal reception, in the synchronization control unit 240 may be included in the reception unit 220.

(Hardware Structure)

In the above functional structure diagrams used for describing an embodiment of the present invention (FIG. 8 and FIG. 9), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless).

Figure 10:
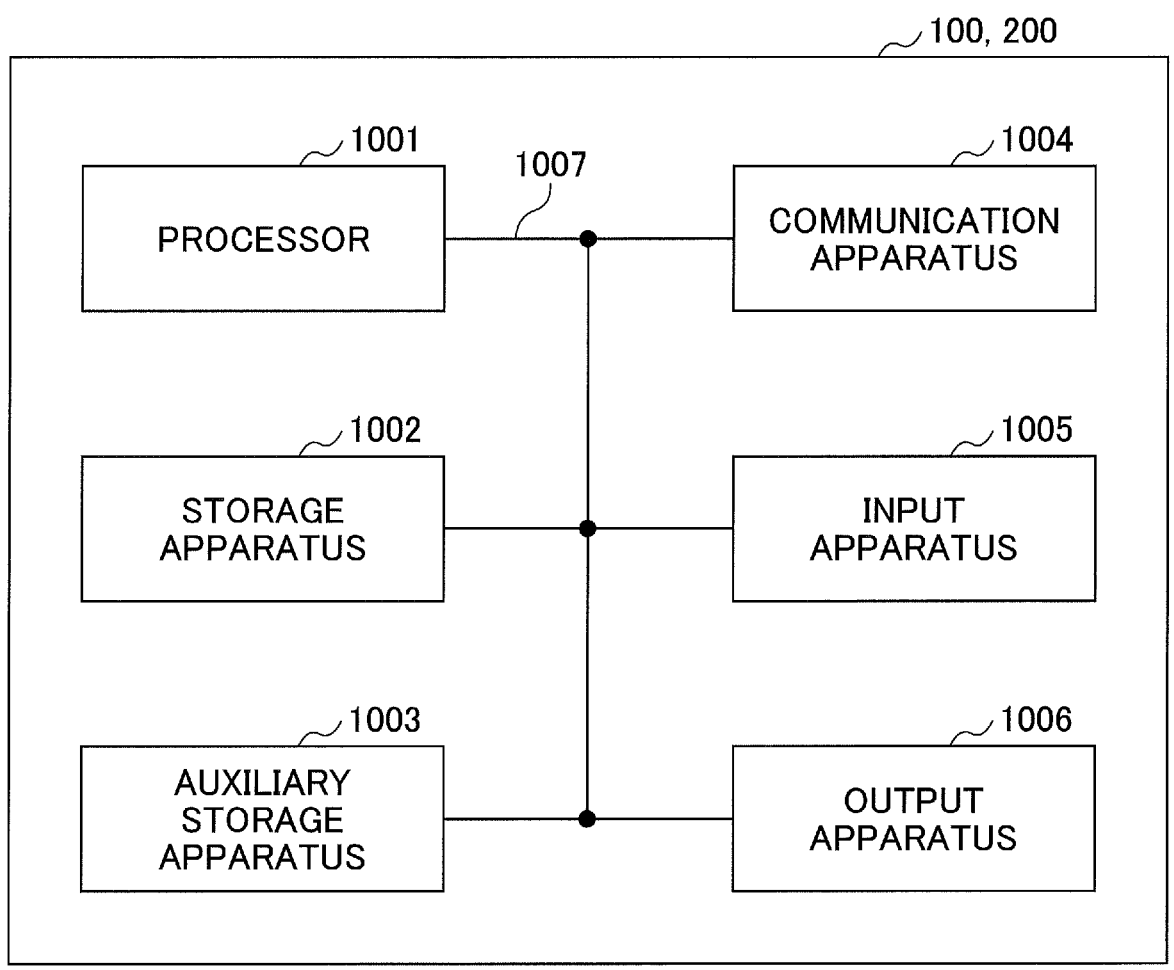
FIG. 10 is a drawing illustrating an example of hardware structure of a base station apparatus 100 or a user apparatus 200 according to an embodiment of the present invention.

Further, for example, a base station apparatus 100 and a user apparatus 200 according to an embodiment of the present invention may function as computers that perform processes according to an embodiment of the present invention. FIG. 10 is a drawing illustrating an example of a hardware structure of a wireless communication apparatus that is a base station apparatus 100 or a user apparatus 200 according to an embodiment of the present invention. Each of the base station apparatus 100 and the user apparatus 200 may be physically a computer apparatus including a processor 1001, a storage apparatus 1002, an auxiliary storage apparatus 1003, a communication apparatus 1004, an input apparatus 1005, an output apparatus 1006, a bus 1007, etc.

It should be noted that, in the descriptions below, the term "apparatus" can be read as a circuit, a device, a unit, etc. The hardware structures of the base station apparatus 100 and the user apparatus 200 may include one or more of each of the apparatuses indicated by 1001 to 1006 illustrated in the figure, or may not include some apparatuses.

Each of the functions of the base station apparatus 100 and the user apparatus 200 is realized by causing predetermined software (program) to be read by hardware such as the processor 1001, the storage apparatus 1002, or the like, by causing the processor 1001 to perform calculations, and by causing the processor 1001 to control communications by the communication apparatus 1004, and to control reading and/or writing data by the storage apparatus 1002 and the auxiliary storage apparatus 1003.

The processor 1001 controls the entire computer by, for example, controlling the operating system. The processor 1001 may include a central processing unit (CPU) including an interface with a peripheral apparatus, a control apparatus, a calculation apparatus, a register, etc.

Further, the processor 1001 reads a program (program code), a software module, or data from the auxiliary storage apparatus 1003 and/or the communication apparatus 1004, writes the program, the software module, or the data to the storage apparatus 1002, and performs various processes according to the program, the software module, or the data. As the program, a program is used that causes the computer to perform at least a part of operations according to an embodiment of the present invention described above. For example, the transmission unit 110, the reception unit 120, the setting information management unit 130, and the synchronization control unit 140 of the base station apparatus 100 illustrated in FIG. 8 may be realized by control programs that are stored in the storage apparatus 1002 and are executed by the processor 1001. Further, for example, the transmission unit 210, the reception unit 220, the setting information management unit 230, and the synchronization control unit 240 of the user apparatus 200 illustrated in FIG. 9 may be realized by control programs that are stored in the storage apparatus 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage apparatus 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage apparatus 1002 may be referred to as a register, a cache, a main memory, etc. The storage apparatus 1002 is enabled to store programs (program codes), software modules, or the like, that are executable for performing processes according to an embodiment of the present invention.

The auxiliary storage apparatus 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The auxiliary storage apparatus 1003 may be referred to as an auxiliary storage apparatus. The above recording medium may be a database including the storage apparatus 1002 and/or the auxiliary storage apparatus 1003, a server, or any other appropriate medium.

The communication apparatus 1004 is hardware (transmission and reception device) for communicating with computers via a wired and/or wireless network, and may be referred to as a network device, a network controller, a network card, a communication module, etc. For example, the transmission unit 110 and the reception unit 120 of the base station apparatus 100 may be realized by the communication apparatus 1004. Further, the transmission unit 210 and the reception unit 220 of the user apparatus 200 may be realized by the communication apparatus 1004.

The input apparatus 1005 is an input device that receives an external input (e.g., keyboard, mouse, microphone, switch, button, sensor). The output apparatus 1006 is an output device that outputs something to the outside (e.g., display, speaker, LED lamp). It should be noted that the input apparatus 1005 and the output apparatus 1006 may be integrated into a single apparatus (e.g., touch panel).

Further, the apparatuses including the processor 1001, the storage apparatus 1002, etc., are connected to each other via the bus 1007 used for communicating information. The bus 1007 may include a single bus, or may include different buses between the apparatuses.

Further, each of the base station apparatus 100 and the user apparatus 200 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Embodiment Summary

As described above, according to an embodiment of the present invention, a user apparatus that performs beamforming-applied communications with a base station apparatus is provided. The user apparatus includes a reception unit configured to receive a beam transmitted from the base station apparatus, a control unit configured to perform control related to recovering a connection to the base station apparatus in a case where the reception unit fails to receive the beam, and a transmission unit configured to transmit a random access preamble or an uplink control signal based on the control related to recovering the connection.

According to the above-described arrangement, the user apparatus 200 is enabled to perform appropriate transmission control of an uplink signal by controlling: a random access procedure for recovering from the beam detection failure; or a recovery procedure via PUCCH. In other words, it is possible for a user apparatus performing beamforming-applied communications to appropriately control transmission of an uplink signal in a process of recovering from a beam detection failure.

The control that is related to recovering connection may include a process in which: a timing alignment timer of a timing alignment group is caused to expire at the time when information indicating a failure of beam reception is received by the MAC layer from the PHY layer, a cell, which includes the reception-failed beam, belonging to the timing alignment group; a timing alignment timer of a timing alignment group is caused to expire at the time when a request for recovering from the beam reception failure is received from the PHY layer by the MAC layer, a cell, which includes the reception-failed beam, belonging to the timing alignment group; or a timing alignment timer of a timing alignment group is caused to expire at the time when a request for recovering from the beam reception failure is received from the PHY layer by the MAC layer and a random access procedure is started, a cell, which includes the reception-failed beam, belonging to the timing alignment group. According to the above arrangement, the user apparatus 200 is enabled to perform appropriate transmission control of an uplink signal by causing the TA timer to expire according to a timing of information transmission to the MAC layer.

In the case where the control that is related to recovering connection causes the timing alignment timer of a timing alignment group to expire, the reception-failed beam being included in a cell and the cell belonging to the timing alignment group, the state of a timing alignment timer of another timing alignment group, which is different from the timing alignment group to which the cell that includes the reception-failed beam belongs, may be maintained. According to the above arrangement, the user apparatus 200 is enabled to perform appropriate transmission control of an uplink signal by causing TA timers to expire or to be maintained according to a TAG to which the cell belongs.

In the case where the random access procedure is started according to the control that is related to the connection recovery, the timing alignment timer of the timing alignment group, to which a cell including the reception-failed beam belongs, may be caused not to expire and transmission may be not performed even if there are uplink transmission opportunities. According to the above arrangement, the user apparatus 200 is enabled to perform appropriate transmission control of an uplink signal by maintaining the TA timer of the TAG to which the cell belongs, and by waiting for the completion of the random access procedure.

The control, which is related to the connection recovery, may perform transmission switching between a random access preamble and an uplink control signal according to the type of the cell including the reception-failed beam. According to the above arrangement, the user apparatus 200 is enabled to perform appropriate transmission control of an uplink signal by switching between the random access procedure and the recovery procedure via PUCCH according to the cell types including a SpCell, an SCell in which PUCCH is configured, a cell in which PRACH is configured, etc.

In the case where another random access procedure has already been started when the MAC layer starts a random access procedure according to the control related to the connection recovery, the random access procedure according to the control related to the connection recovery may be stopped and information indicating the stop may be transmitted from the MAC layer to the PHY layer or to the RRC layer. According to the above arrangement, the user apparatus 200 is enabled to perform appropriate transmission control of an uplink signal by transmitting information indicating the stopping of the random access procedure according to the control related to the connection recovery to other layers without stopping the already-started random access procedure.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, a user apparatus UE, or a base station eNB has been described by using functional block diagrams. However, the apparatuses may be realized by hardware, software, or a combination of hardware and software. The software executed by a processor included in a user apparatus UE according to an embodiment of the present invention and the software executed by a processor included in a base station eNB according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information transmission (notification, reporting) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, an RRC message may be referred to as RRC signaling. Further, an RRC message may be, for example, an RRC connection setup message, an RRC connection reconfiguration message, or the like.

Aspects and embodiments described in the present specification may be applied to a system in which LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems are used, or may be applied to a next generation system enhanced based on the above systems.

The order of processing steps, sequences or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station apparatus 100 in the present specification, may be performed by an upper node in some cases. In a network including one or more network nodes including a base station apparatus 100, it is apparent that various operations performed for communicating with a user apparatus 200 may be performed by the base station apparatus 100 and/or another network node other than the base station apparatus 100 (for example, but not limited to, MME or S-GW). According to the above, a case is described in which there is a single network node other than the base station apparatus 100. However, a combination of multiple other network nodes may be considered (e.g., MME and S-GW).

An aspect/embodiment described in the present specification may be used independently, may be used in combination, or may be used by switching according to operations.

There is a case in which the user apparatus 200 may be referred to, by a person skilled in the arte, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

There is a case in which the base station apparatus 100 may be referred to, by a person skilled in the art, as a NB (NodeB), an eNB (enhanced NodeB), a gNB, a base station, or some other appropriate terms.

As used herein, the term "determining" may encompasses a wide variety of actions. The "determining" may include, for example, a case in which "judging", "calculating", "computing", "processing", "deriving", "investigating", "looking up" (e.g., looking up a table, database, or other data structures), or "ascertaining" is deemed as "determining". Also, "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining".

The description "based on" used in the present specification does not mean "based on only" unless otherwise specifically noted. In other words, the phrase "base on" means both "based on only" and "based on at least".

When the terms "include", "including", and variations thereof are used in the present specification or in the claims, the terms are intended to be non-restrictive (to be considered "open terminology") the same as the term "comprising". Further, the term "or" used in the present specification or in the claims is intended to be not an "exclusive or".

Throughout the present specification, in the case where articles "a", "an", and "the" are added to a noun as a result of translation, unless otherwise indicated, the noun may be plural.

It should be noted that, in an embodiment of the present invention, the initial access control unit 240 is an example of a control unit. The synchronization setting unit 140 is an example of a setting unit.

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. In other words, the descriptions of the present specification are for illustrative purposes only, and are not intended to be limitations to the present invention.

The present application is based on and claims priority to Japanese patent application No. 2017-229571 filed on Nov. 29, 2017, the entire contents of which are hereby incorporated herein by reference.

DESCRIPTION OF THE REFERENCE NUMERALS

100 Base station apparatus
200 User apparatus
110 Transmission unit
120 Reception unit
130 Setting information management unit
140 Synchronization setting unit
200 User apparatus
210 Transmission unit
220 Reception unit
230 Setting information management unit
240 Synchronization control unit
1001 Processor
1002 Storage apparatus
1003 Auxiliary storage apparatus
1004 Communication apparatus
1005 Input apparatus
1006 Output apparatus

What is claimed is:

1. A terminal comprising:
a receiver configured to receive a beam transmitted from a base station apparatus;
a processor configured to perform control that is related to recovery of connection to the base station apparatus in the case where the receiver fails to receive the beam; and
a transmitter configured to transmit a random access preamble or an uplink control signal based on the control that is related to recovery of connection,
wherein, in the case where a random access procedure according to the control that is related to recovery of connection is started, transmission is not performed even if there is a physical uplink shared channel according to an uplink grant other than a channel related to a random access procedure until the random access procedure is completed.

2. The terminal according to claim 1, wherein the control that is related to recovery of connection includes:
causing a timing alignment timer of a timing alignment group to expire when a MAC layer receives information indicating a beam reception failure from a PHY layer, wherein the timing alignment group is a group to which a cell belongs and the reception-failed beam is included in the cell;
causing a timing alignment timer of a timing alignment group to expire when the MAC layer receives from the PHY layer a request for recovery from the beam reception failure, wherein the timing alignment group is a group to which a cell belongs and the reception-failed beam is included in the cell; or
causing a timing alignment timer of a timing alignment group to expire when the MAC layer receives from the PHY layer a request for recovery from the beam reception failure and a random access procedure is started, wherein the timing alignment group is a group to which a cell belongs and the reception-failed beam is included in the cell.

3. The terminal according to claim 2, wherein, in the case where the control that is related to recovery of connection causes the timing alignment timer of the timing alignment group to expire, wherein the timing alignment group is a group to which a cell belongs and the reception-failed beam is included in the cell, a state of a timing alignment timer of a timing alignment group, which is different from the timing alignment group whose timer is caused to expire, is maintained.

4. The terminal according to claim 1, wherein the control that is related to recovery of connection performs transmission selecting between a random access preamble and an uplink control signal according to a type of a cell including the reception-failed beam.

5. The terminal according to claim 1, wherein, in the case where another random access procedure has already been started when a MAC layer starts a random access procedure according to the control related to recovery of connection,
the random access procedure according to the control related to recovery of connection is stopped and
information indicating the stopping is transmitted from the MAC layer to a PHY layer or an RRC layer.

6. A radio communication method for a terminal, comprising:
receiving a beam transmitted from a base station apparatus;
performing control that is related to recovery of connection to the base station apparatus in the case where the terminal fails to receive the beam; and
transmitting a random access preamble or an uplink control signal based on the control that is related to recovery of connection,
wherein, in the case where a random access procedure according to the control that is related to recovery of connection is started, transmission is not performed even if there is a physical uplink shared channel according to an uplink grant other than a channel related to a random access procedure until the random access procedure is completed.

7. A system comprising:
a terminal comprising:
a receiver of the terminal configured to receive a beam transmitted from a base station apparatus;
a processor configured to perform control that is related to recovery of connection to the base station apparatus in the case where the receiver fails to receive the beam; and
a transmitter of the terminal configured to transmit a random access preamble or an uplink control signal based on the control that is related to recovery of connection,
wherein, in the case where a random access procedure according to the control that is related to recovery of connection is started, transmission is not performed even if there is a physical uplink shared channel according to an uplink grant other than a channel related to a random access procedure until the random access procedure is completed, and
the base station apparatus comprising:
a transmitter of the base station apparatus configured to transmit the beam to the terminal;
a receiver of the base station apparatus configured to receive the random access preamble or the uplink control signal from the terminal.

* * * * *